US007871033B2

(12) United States Patent
Karem et al.

(10) Patent No.: US 7,871,033 B2
(45) Date of Patent: Jan. 18, 2011

(54) TILT ACTUATION FOR A ROTORCRAFT

(75) Inventors: Abe Karem, Tustin, CA (US); William Martin Waide, Wrightwood, CA (US); Dan Patt, Lake Forest, CA (US)

(73) Assignee: Karem Aircraft, Inc, Lake Forest, CA (US)

( * ) Notice: Subject to any disclaimer, the term of this patent is extended or adjusted under 35 U.S.C. 154(b) by 0 days.

(21) Appl. No.: 12/422,042

(22) Filed: Apr. 10, 2009

(65) Prior Publication Data
US 2009/0256026 A1    Oct. 15, 2009

Related U.S. Application Data

(60) Provisional application No. 61/044,429, filed on Apr. 11, 2008.

(51) Int. Cl.
*B64C 27/22* (2006.01)
(52) U.S. Cl. .................... 244/7 A; 244/7 C; 244/17.23; 244/56
(58) Field of Classification Search ................. 244/7 A, 244/7 C, 17.23, 56, 7 R, 17.11, 66, 12.4
See application file for complete search history.

(56) References Cited

U.S. PATENT DOCUMENTS

| 3,035,789 | A | * | 5/1962 | Young | 244/7 C |
|3,246,861 | A | * | 4/1966 | Curci | 244/7 A |
|3,905,565 | A | | 9/1975 | Kolway | |
|4,519,743 | A | | 5/1985 | Ham | |
|4,979,698 | A | | 12/1990 | Lederman | |
|5,054,716 | A | * | 10/1991 | Wilson | 244/56 |
|5,085,315 | A | | 2/1992 | Sambell | |
|5,096,140 | A | * | 3/1992 | Dornier et al. | 244/7 C |
|5,709,357 | A | * | 1/1998 | von Wilmowsky | 244/7 R |
|5,839,691 | A | | 11/1998 | Lariviere | |
|5,868,351 | A | * | 2/1999 | Stamps et al. | 244/7 R |
|6,220,545 | B1 | | 4/2001 | Fenny et al. | |
|6,247,667 | B1 | | 6/2001 | Fenny et al. | |
|6,276,633 | B1 | * | 8/2001 | Balayn et al. | 244/56 |
|6,328,256 | B1 | * | 12/2001 | Ryan et al. | 244/7 R |
|6,607,161 | B1 | * | 8/2003 | Krysinski et al. | 244/7 A |
|6,616,095 | B2 | | 9/2003 | Stamps et al. | |

FOREIGN PATENT DOCUMENTS

WO    2006/041455    4/2006

\* cited by examiner

*Primary Examiner*—Christopher P Ellis
(74) *Attorney, Agent, or Firm*—Fish & Associates, PC

(57) ABSTRACT

An aircraft is equipped with hingeless rotors on tilting nacelles, and the tilt angles of the nacelles are controlled using either or both of an actuator and a mast moment generated by a hingeless rotor. An aircraft with two or more rotors on tilting nacelles can achieve control of yaw orientation by differential tilt of its nacelles or masts. Hingeless rotors can be manipulated to control a tilt angle of a mast by changing the rotor blade pitch to produce a mast moment. The rotor and nacelle tilt of a tiltrotor rotorcraft can be controlled and effected in order to manipulate the yaw orientation and flight mode of a rotorcraft such as a tiltrotor. The use of mast moment to control nacelle tilt angle can reduce tilt actuator loads and allows for the control of nacelle tilt even in the event of an actuator failure.

7 Claims, 5 Drawing Sheets

TILT ACTUATION FOR A ROTORCRAFT

This application claims priority to U.S. Provisional Application Ser. No. 61/044,429 filed Apr. 11, 2008 which is incorporated by reference herein in its entirety.

FIELD OF THE INVENTION

The field of the invention is rotorcraft.

BACKGROUND

Tilt rotor and tilt wing aircraft convert between a forward flight cruise mode and a hover mode by converting the orientation of their propellers or rotors and nacelles. FIG. 1 shows a typical prior art tiltrotor aircraft 100 comprising a wing 102 and fuselage 104 with a first rotor 120 and first nacelle 114 in aircraft cruise mode corresponding with a generally horizontal position of the nacelle 104. The aircraft is also equipped with a second rotor 130 on the opposite end of the wing 102. In a typical tilt rotor aircraft 100, the nacelle 104 is also capable of operation in a generally vertical position used in helicopter mode flight. The nacelle 104 tilt angle is usually effected using a tilt actuator and mechanism to convert from helicopter mode flight to aircraft cruise mode. The mechanism that enables this conversion plays an important role in the overall reliability and safety of the aircraft. The mechanism must be both reliable and robust. In the aircraft industry robustness often takes the form of fault tolerance. In this manner the device must not only be robust in the face of harsh operating conditions, it must also be arranged in such a manner that it will continue to operate at a functional level with one or more critical components non-functional. Weight is also a critical factor in the efficiency of all aircraft. Thus, the conversion mechanism must achieve safety and reliability at a minimum weight while being able to deal with the substantial rotor forces and moments encountered during conversion.

Several methods of converting an aircraft between a hover mode and a forward flight mode have been suggested, but all involve overcoming opposing aerodynamic and inertia forces using said actuator. One of the first operational tilt-rotor designs was the Bell™ XV-15, which achieves conversion of the nacelle through the use of a linear actuator on a three-bar mechanism. The XV-15 actuator is a linear actuator, and when extended, the angle between the nacelle and the wing increases. Dual redundant hydraulic systems are arranged on the common actuator to increase the reliability of the system. During forward flight in this and other fielded tilt rotor designs, the nacelle is in a horizontal position, with the rotor producing thrust in the horizontal direction. In this position, it is common practice to lock the nacelle when horizontal to reduce the load on the actuator.

The Bell™ V-22 was developed subsequently to the XV-15 demonstrator. This vehicle used a similar 3 bar mechanism to tilt the nacelle. As with the XV-15, the V-22 actuator generally comprises first and second hydraulic motors that act on a common axis. A third electric motor provides for triple redundancy. In this arrangement, a failure of the first motor will not stop the mechanism from functioning.

The most recent tilt rotor aircraft, the Bell™ 609 has a tilt mechanism (also known as a conversion actuator) that uses a generally similar linear actuator on a three bar linkage, where the wing and the nacelle comprise two of the three bars, and the actuator comprises the third. The Bell™ 609 also has a shaft interconnection between left tilt actuator and right tilt actuator, which allows one actuator to tilt both nacelles, but specifically disallows differential tilting. Aspects of the Bell™ 609 conversion actuator system are described in U.S. Pat. No. 6,220,545 to Fenny et al., and in U.S. Pat. No. 6,247,667 also to Fenny et al.

The Fenny references and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

FIG. 2 is a top view schematic view of the prior art Bell™ V-22 conversion system, showing the nacelle 204 coupled to the wing 202 by means of a tilt spindle 210. An actuator 214 connected to an actuator spindle 212 allows the nacelle 204 to rotate with respect to the wing 202 in order to convert between flight modes. An engine and gearbox 220 are coupled to a shaft 222 that is also a mast. The shaft 222 is coupled to the hub 228 by means of a gimbal joint 224 which allows rotation of the hub 228 with respect the shaft 222 in several directions and greatly reduces the transfer of bending moments from the hub 228 to the shaft 222 and nacelle 204. A blade 230 that can change pitch is coupled to the hub 228.

A small unmanned Bell™ tiltrotor, known as the Eagle-Eye™, is also equipped with a conventional gimbaled rotor and a conversion actuator system. Aspects of the tilt mechanism are described in WIPO Publication Number 2006/041455. This conversion actuator uses a four bar linkage in the tilt mechanism to facilitate nacelle tilt and conversion between flight modes. Methods of conversion described are conventional; the actuator is powered to force the nacelle, mast, and rotor to tilt to a desired conversion angle, reacting any aerodynamic or inertial forces on the rotor and In general, prior art tiltrotors are of the gimbaled type, for which the blades and hub can be oriented somewhat independently of the mast and nacelle. That is, their rotors are allowed to tilt about a point at the hub to nacelle or blade to hub interface, but their masts remain stationary with respect to the non-rotating aircraft in any given flight mode. This hinging means the rotors do not transmit large moments from the rotor to the aircraft structure. Instead, the rotor transmits only a thrust vector. As such, these tilting mechanisms do not have to overcome the large rotor moments that would be associated with a hingeless tilt-rotor. For gimbaled rotors, aircraft yaw control can be achieved with application of rotor cyclic alone, effectively reorienting the hubs (and thus thrust vectors) of two rotors on either end of a wing to affect a yaw moment and thus a yaw rotation of the aircraft.

Differential nacelle tilt as a control concept has been considered in the prior art. The US Air Force report "Design studies and model tests of the stowed tilt rotor concept" by Bernard L. Fry suggests that a combination of differential nacelle tilt and rotor blade pitch cyclic for yaw control could reduce the high cyclic forces produced if yaw control is obtained with cyclic only. In a very different application, for a fighter with tilting jet engines differential nacelle tilt to control yaw has also been suggested as documented in "German V/STOL fighter program" by Albert C. Piccirillo, AIAA Press, 1997.

Since the prior art tilting mechanisms are all simple nacelle rotating devices, mechanized by linear actuators they are unable to accommodate very large moments that might be generated. For example, if one needed a nacelle moment of say 450,000 ft lb and an actuator arm of 1.5 ft, then the unit force would be 300,000 lb. The prior art actuator mechanisms cannot practically produce such large forces. Moreover, such these large forces place undesirably large demands on the actuator, especially when actuator failures must be accommodated for vehicle fault tolerance. Thus, there is still a need for apparatus, systems and methods that rotate the nacelle of a tilt rotor aircraft, especially in the case of a hingeless rotor where the rotor can induce a large moment.

SUMMARY OF THE INVENTION

The present invention provides apparatus, systems and methods in which an aircraft is equipped with hingeless rotors on tilting nacelles, and the tilt angles of the nacelles are controlled using either or both of an actuator and a mast moment generated by one or more of the hingeless rotors. It is contemplated that an aircraft with two or more rotors on tilting nacelles can achieve control of yaw orientation by differential tilt of its nacelles. Still further, hingeless rotors can be manipulated to control a tilt angle of a nacelle or mast by changing the rotor blade pitch on the rotor to produce a mast moment. In this way, the nacelle tilt of a tiltrotor rotorcraft can be controlled and effected in order to manipulate the orientation and flight mode of said rotorcraft.

The use of mast moment to control nacelle tilt angle can reduce the loads that a tilt actuator needs to produce, and advantageously allow, the continued control of nacelle tilt even in the event of an actuator failure. It is also contemplated that a tilting mast could be configured with a brake capable of locking the tilt angle between said mast and a wing or other aircraft part. Such a brake could advantageously be used in cooperation with mast moment to accommodate a failure of a tilt actuator.

When a first tilt angle of a first rotor on a first tilting mast is controlled independently from a second tilt angle of a second rotor on a second tilting mast, the masts may tilted differentially, with the first tilted forward and the second tilted back by one or more degrees, thereby create a yawing moment to assist in rotating an aircraft.

Preferred aircraft are equipped with a tilt actuator and mechanism that is capable of generating large forces in order to control a tilting mast. The tilting mechanism can advantageously comprise a 4 bar linkage and a rotary actuator that cooperate to assist in tilting the first mast. In a tiltrotor aircraft, a tilting mast can advantageously be rotatably coupled to a wing. Preferred actuators include those with electric motors, and more preferably with motors constructed to operate on more than three phases.

Viewed from another aspect, preferred methods allow for control of tilting nacelles of any suitable configuration of aircraft, including those with first and second rotors in a tandem rotor rotorcraft configuration, and those with first and second rotors in a side by side rotor rotorcraft configuration.

DETAILED DESCRIPTION

Figure 1:
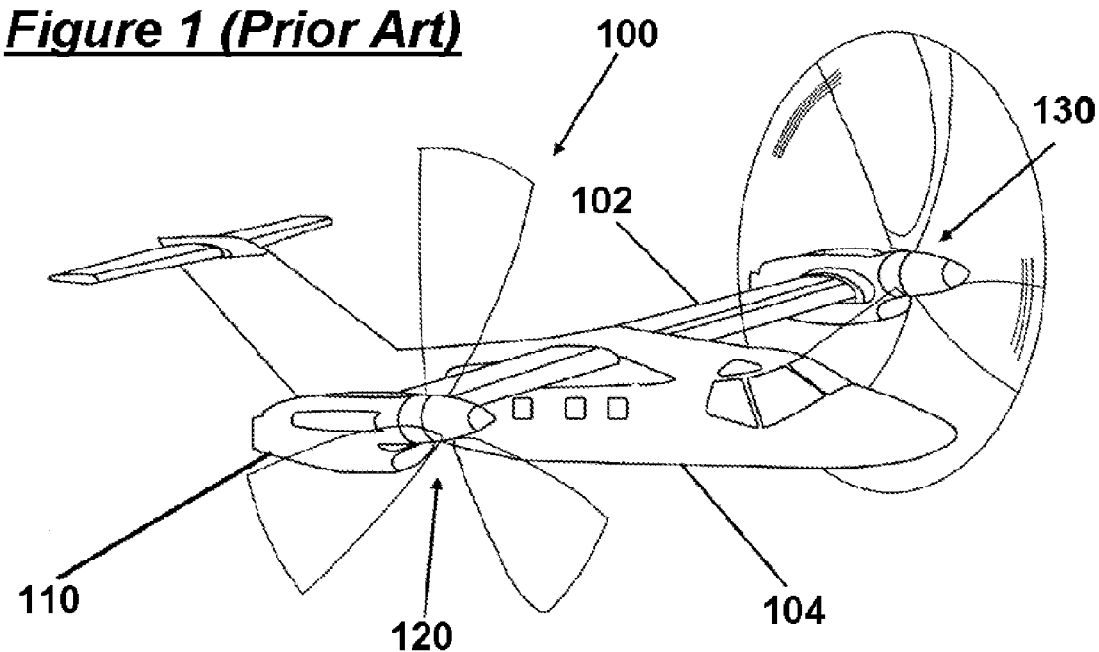
FIG. 1 is a perspective illustration of a prior art tiltrotor aircraft.
Figure 2:
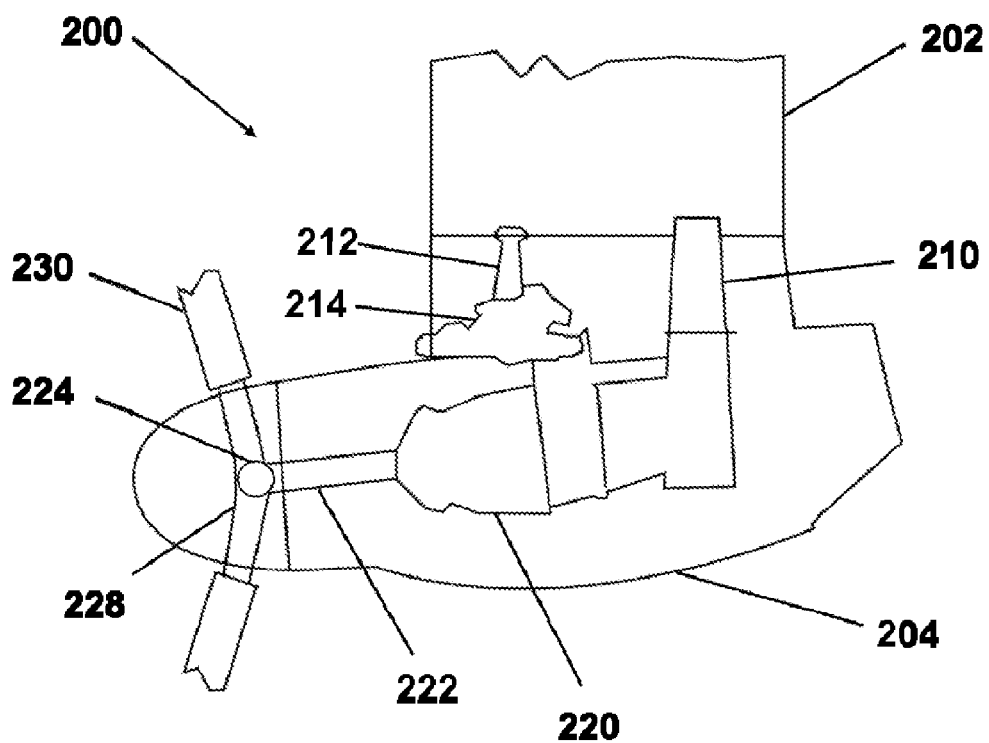
FIG. 2 is a top view schematic of a prior art tilting nacelle and conversion mechanism.
Figure 3:
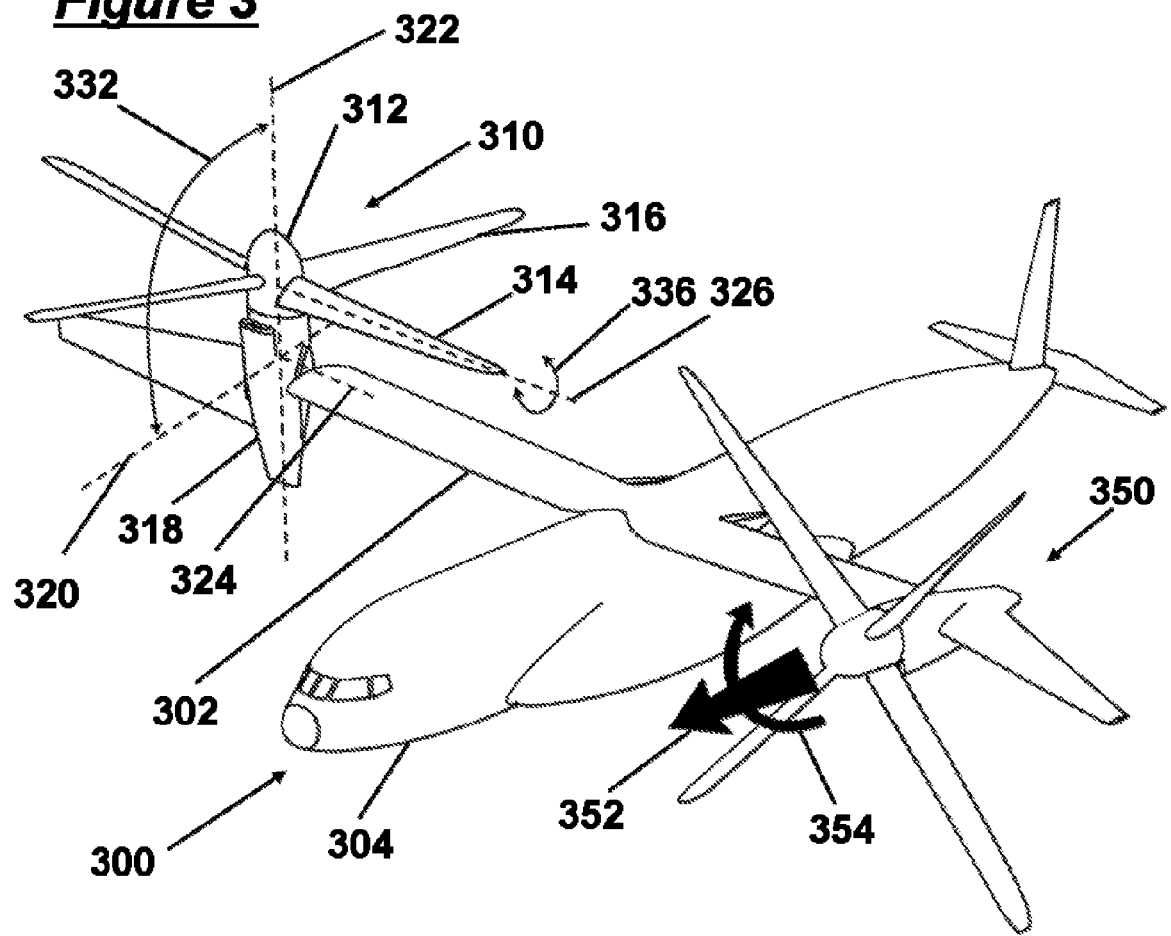
FIG. 3 is a perspective illustration a preferred tiltrotor aircraft with hingeless rotors.

FIG. 3 is a perspective illustration of a preferred tiltrotor aircraft 300 comprising a wing 302 and fuselage 304, a first tilting rotor system 310 shown in helicopter-mode position, and a second tiling rotor system 350 shown in airplane cruise-mode. The wing 302 remains essentially fixed to the fuselage 304 during flight in either vertical takeoff mode or cruise flight. In preferred embodiments, the first and second rotors in the first and second rotor systems 310,350 are of a stiff hingeless variety such as that described in U.S. Pat. No. 6,641, 365 to Karem. Such rotor systems 350 transmit considerable forces and moments to the wing 302 and fuselage 304. In either helicopter-mode flight or airplane-mode cruise flight, the rotor generates thrust as indicated by block arrow 352 and moment as indicated by block arrow 354. Hingeless rotor systems for tiltrotors are unlike prior art gimbaled systems in that they can transmit considerable large moments, also referred to as mast moments, to the airframe.

A rotor system 310 comprises a tilting nacelle 318, which also serves as a tilting mast in the case of this hingeless rotor system, and a hub 312 which is not gimbaled with respect to the nacelle 318. The rotor rotates about the nacelle axis 322. The tilt angle, indicated by arrow 332, is the angle between the horizontal airframe axis 320 and the nacelle axis 322. The entire rotor system 310 including the nacelle 318 is rotatably coupled to the wing 302 by means of a tilt actuator and spindle. The rotor system 310 tilts with respect to the wing 302 about the tilt axis 324. First and second blades 314, 316 are preferably coupled to the hub 312 without hinges in the flap or lag directions. A blade 314 can pitch about a blade pitch axis 326 in the direction indicated by arrow 336. It is contemplated that blade pitch can be controlled and commanded by the pilot or flight control computer, and that blade pitching motion can have a collective command that increases thrust, and a cyclic command that generates mast moment by changing blade pitch as a function of azimuth while the blades rotate.

A tilting nacelle 318 can advantageously be configured to rotate by a tilt angle, indicated by arrow 332, of at least 90, 100, 110, or even 120 degrees. A 90 degree tilt would correspond with the ability to tilt from fully horizontal to fully vertical. In implementing differential nacelle tilt, it is advantageous to configure the tilting nacelle to rotate beyond this range. In an aircraft having two tilting nacelles, the tilt angle of each nacelle can be controlled independently of the other, as each has a separate actuation system.

Unless a contrary intent is apparent from the context, all ranges recited herein are inclusive of their endpoints, and open-ended ranges should be interpreted to include only commercially practical values. Similarly, all lists of values should be considered as inclusive of intermediate values unless the context indicates the contrary.

Figure 4:
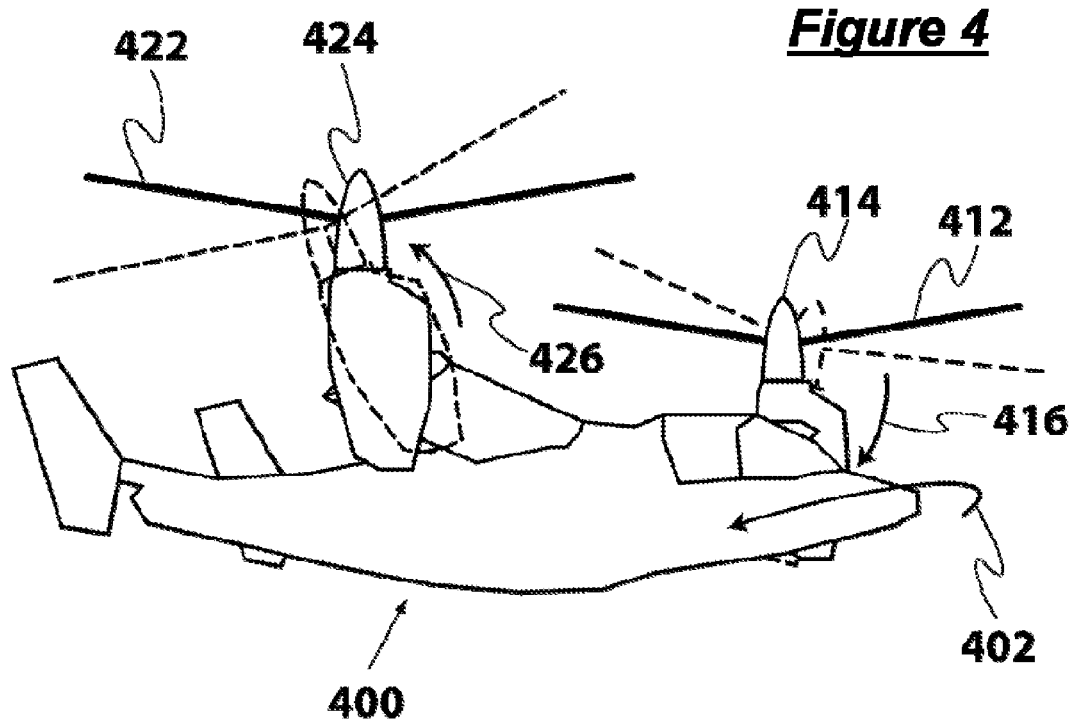
FIG. 4 is a perspective illustration of a preferred tiltrotor aircraft using preferred methods to tilt nacelles and control aircraft yaw orientation.

FIG. 4 illustrates an alternate preferred aircraft 400 having a first hingeless rotor 412 and second hingeless rotor 422 on first and second tilting masts 414,424 respectively. Further, each of the first and second tilting masts 414,424 are coupled to first and second tilt actuators (not shown) capable of affecting the tilt angle of the masts 414,424. The first mast 414 has a first tilt angle indicated by arrow 426, while the second mast has a second tilt angle indicated by arrow 416.

It is further contemplated that a hingeless rotor 412 would comprise pitchable blades coupled to a hub. One skilled in the art will realize that by changing the pitch of the blades on a hingeless rotor, a mast moment is generated. On a tiltrotor aircraft 400, this mast moment can advantageously be used to control the tilt angle of the mast 414 and rotor 412 either in cooperation with a tilt actuator, or in isolation. Using mast moment in cooperation with an actuator means that both apply a force or moment in the same direction.

From another perspective, one can control the orientation an aircraft 400 by controlling a first tilt angle 416 of the first mast 414, and controlling a second tilt angle 426 of the second mast 424 independently of the first tilt angle 416 to create a yawing moment to assist in rotating the aircraft 400 in the direction shown by the arrow 402. In an especially preferred embodiment, one can use a mast moment to assist in tilting the first mast.

These methods of controlling an aircraft are remarkably different from methods found in the prior art. Prior art tiltrotor aircraft have gimbaled rotors, are generally incapable of generating mast moment, and thus would be unable to control tilt angle using mast moment generated by blade pitch changes. Indeed, there would be no motivation to do so. While using differential nacelle tilt to control aircraft yaw has been contemplated in the known prior art, it was always implemented using only a tilt actuator to force nacelles to tilt. What the prior art failed to appreciate was that by combining a tiltrotor with a hingeless rotor and a tilting mechanism, the tilt angle of rotors, masts, and nacelles could be at least partially controlled by changing blade pitch. The prior art also failed to appreciate that aircraft yaw for a hingeless tiltrotor aircraft can be advantageously controlled by differential nacelle tilt.

Figure 5:
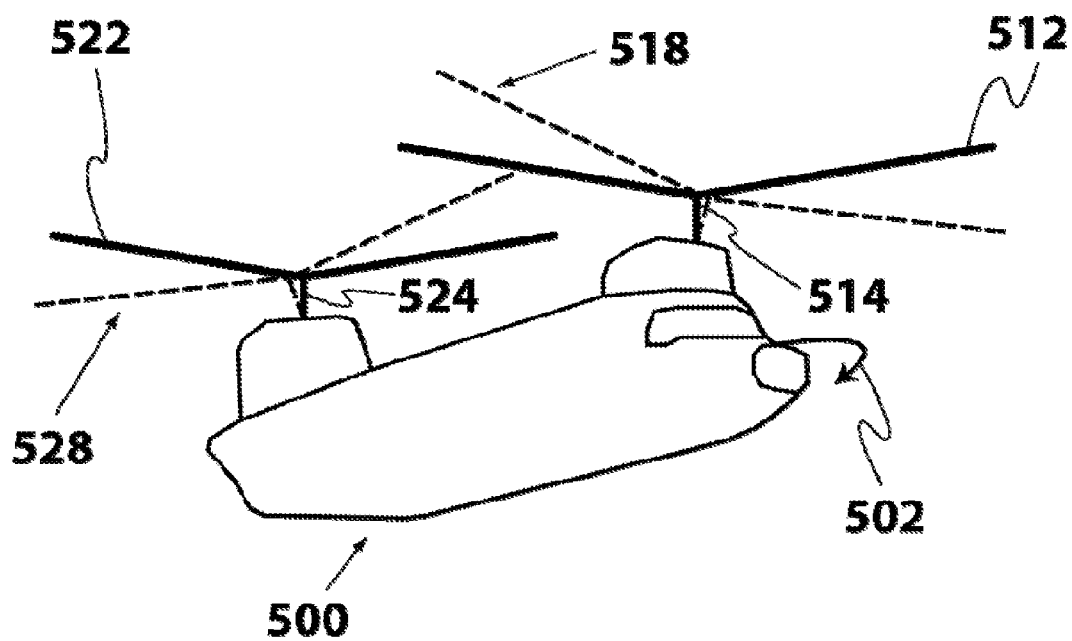
FIG. 5 is a perspective illustration of a tandem rotor aircraft using preferred methods to tilt its rotors.

Another application is contemplated in FIG. 5, wherein one controls a tandem hingeless rotor rotorcraft 500 with a first rotor 512 on a tilting mast 514 and a second rotor 522 on a second tilting mast 524 by tilting the first rotor and mast 512, 514 to a new position 518, and independently tilting the second rotor and mast 522, 524 and mast to a new position 528 to create a yawing moment to assist in rotating the aircraft in the direction shown by the arrow 502.

These methods are applicable to rotorcraft having a side-by-side rotor rotorcraft configuration 300, 400, a tandem rotor rotorcraft configuration 500, and a quad rotor rotorcraft configuration, and are contemplated to be especially advantageous where the rotors are hingeless rotors. The quad rotor rotorcraft configuration is effectively a combination of the side by side rotor rotorcraft configuration 400 and tandem rotor rotorcraft configuration 500.

Figure 6:
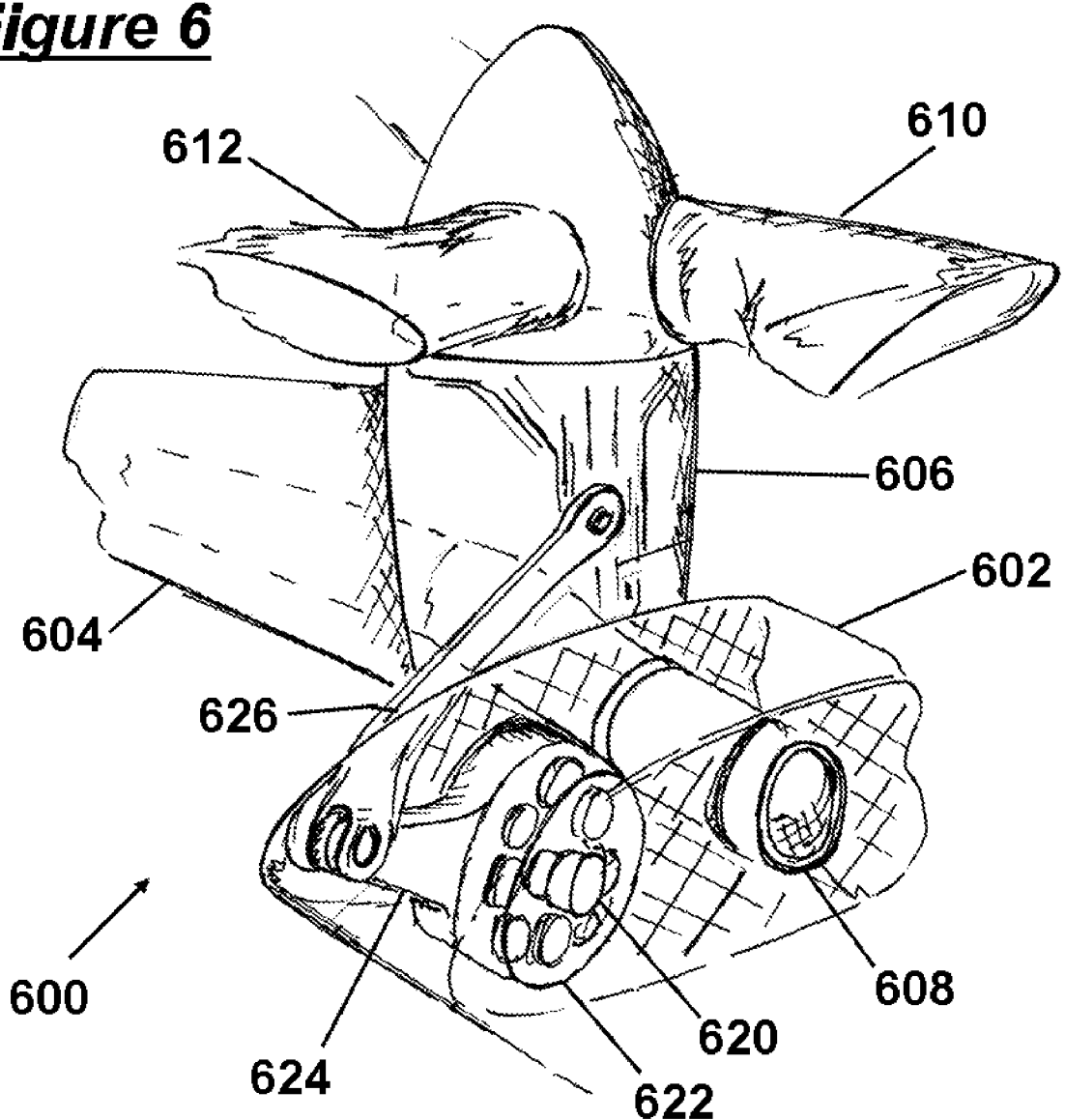
FIG. 6 is a perspective illustration of a preferred nacelle tilting mechanism and structure.

FIG. 6 is a perspective illustration of a preferred tilting rotor system 600. The rotor system 600 has a rotor comprising first and second blades 610, 612 which rotate with respect to a tilting nacelle 606 that is also a tilting mast. An outboard wing 604 is coupled to the tilting nacelle 606 and rotates with the nacelle 606. The tilting nacelle 606 tilts with respect to an inboard wing 602, coupled to an aircraft fuselage. An actuator comprises a motor 620 and a reduction gearbox 622 predominately disposed within the inboard wing 602.

The reduction gearbox 622 is coupled to a first link 624 and second link 624, which can transfer a motive force to the nacelle. This advantageously creates a four-bar link mechanism, useful for force multiplication. The nacelle rotates about a support spar 608. The reduction gearbox 622 preferably comprises a co-axial input and output or other planetary gear system. All suitable motors are contemplated, including an electric motor and electric motors wound for at least three, four, five, or even six phases. Such motors would provide an additional degree of fault tolerance.

By using mast moment in cooperation with a tilt actuator to tilt the nacelle, complete faults of the tilt actuator can be tolerated. Additionally, a brake can advantageously be interposed in the actuation system to brake or stop the nacelle tilt at any desired angle, even in the case of a complete actuator failure. With actuators functional, the nacelle can be locked in place at a desired angle using either a tilt actuator or brake. Further, it is contemplated that rotors on opposite sides of a tiltrotor aircraft can be alternately braked and controlled in order to provide a conversion between helicopter and airplane flight modes.

Figure 7:
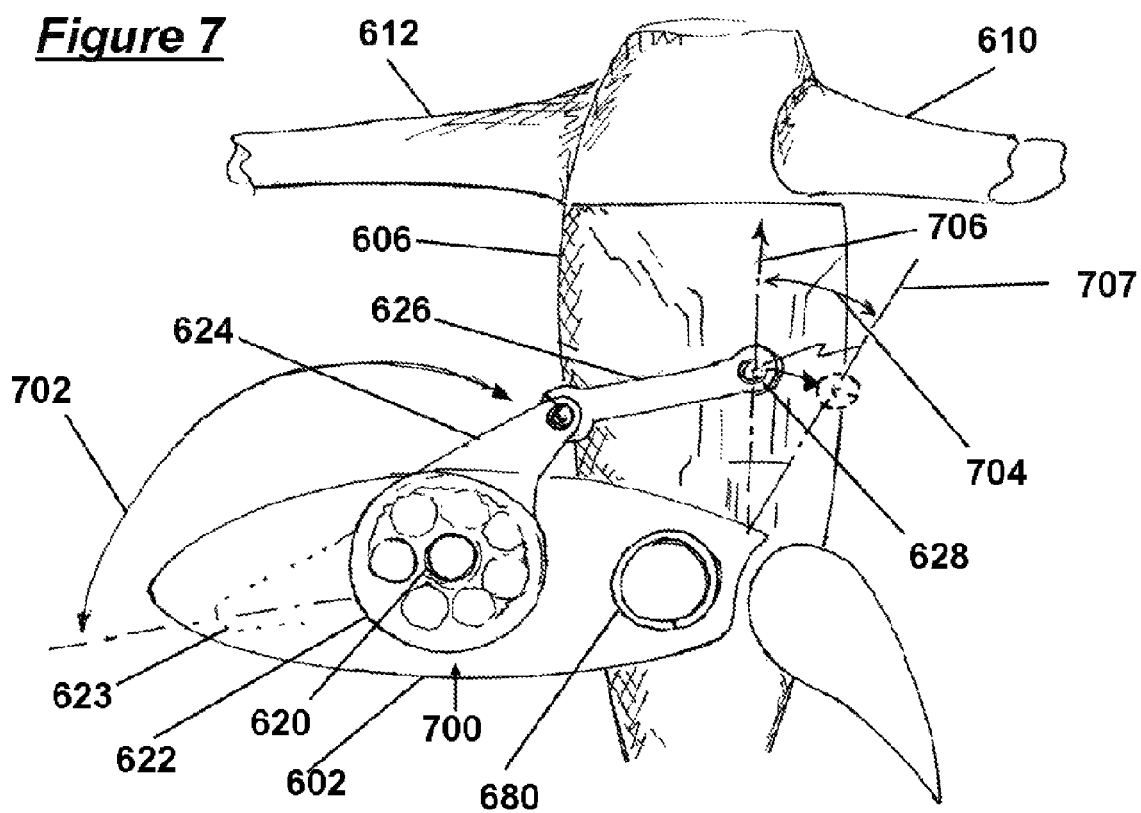
FIG. 7 is a side view schematic of the nacelle tilting mechanism and structure of FIG. 6.

FIG. 7 is a side view schematic showing additional detail of a preferred tilt mechanism. Here the actuator 700 is mounted securely between the two end ribs (not shown) of the inner wing 602. The 4-bar linkage comprises a first link 624, and second link 626, the tilting nacelle 606, and the inner wing 602. The actuator 700 provides rotation of link 624 through an arc of 150, 160, or 170 degrees from a rest position 623 shown in dashed lines. A second link 626 is coupled to the first link 624 by means of a joint. The opposite end of the second link 626 is coupled to the nacelle 606 by another joint 628.

The joint 628 and nacelle 606 can be positioned along a vertical axis 706 or rotated through an angle 704 to an aft position 707, as is contemplated to produce aftward thrust for yaw control and ground maneuvering.

This particular embodiment provides several advantages over known prior art. The rotary actuator is embedded in the inboard wing structure; hence the electrical wiring for power and control is not subject to movement. When fully retracted in forward flight mode, the link arms are completely concealed inside the wing and wing fairing, eliminating drag losses due to exposed parts. For the extremely high actuator torques required for operation in a hingeless rotor aircraft, a geared system is more weight efficient, and packages well inside the wing spar. Additionally, preferred embodiments envision application to a hingeless rotor equipped to differentially tilt the right and left nacelles to create a vehicle yaw moment. In such a configuration a four bar mechanism can be configured to provide greater rotation angle resolution near the vertical position of the nacelle, and faster transition at the horizontal range. This would allow for finer yaw control of the aircraft. One of ordinary skill in the art could readily engineer a 4-bar mechanism that would provide such greater resolution near the vertical position of the nacelle.

Thus, from a method perspective, one can advantageously operate an aircraft having a rotor and a rotor mast by providing a mechanism that allows for tilting of the rotor and mast together, and applying a mast moment of the rotor to maintain the mast at a desired tilt angle. In a preferred embodiment the method can further comprise maintaining the desired tilt angle in a forward flight mode by applying the moment against a tilt position mechanical stop. Optionally, one can utilize an actuator that provides a force that cooperates with the mast moment to tilt the mast. It is contemplated that one can also engage a brake upstream of the gear drive, such as on the motor or actuator, to lock the mast at a desired tilt angle.

An especially preferred embodiment employs inert structural members for all link arms. Therefore, unlike the prior art, any moving parts are not susceptible to grit or other contamination from the environment, and do not require sliding seals. They can be constructed with ballistic tolerant materials such as Kevlar or titanium. All joint and bearing movements are rotational, and hence can be sealed more reliably than open screw jacks or sliding surfaces. A contamination-laden atmosphere or ice occlusion will not prevent joint rotation.

In addition to the simple mechanical operation of preferred tilting mechanisms, especially preferred embodiments envision usage in a hingeless rotor system. Such a rotor produces large mast moments that can be employed in the tilting of the nacelle and rotor. In this hingeless rotor configuration, a mast moment from the rotor can be applied to maintain the mast at a desired tilt angle by varying the cyclic of the rotor to balance its position. The desired tilt angle can be maintained in forward flight mode by applying the moment against an actuator braking device or other a tilt position mechanical stop. This capability would further increase the redundancy of the system by enabling the tilt mechanism and vehicle to operate even in the event of a tilt mechanism lock failure. By advantageous use of link geometry, actuator loads in any case are minimized in hover and forward flight nacelle positions.

The use of hingeless rotor mast moments in the operation of the tilting mechanism provides further advantages. The operating load on the actuator can be reduced by coordinating the mast moment from the rotor system to assist the tilt motion of the mechanism. A vehicle yawing moment can be developed through the use of variable tilt angle on left and right rotors. In tandem configurations the same result could be achieved between forward and aft rotors. Here the four bar linkage of the preferred embodiment would allow for greater position control near the vertical position of the nacelle.

Thus, specific embodiments and applications of a tilt actuation mechanism have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C ... and N, the text should be interpreted as requiring only one element from the group, not A plus N, or B plus N, etc.

What is claimed is:

1. A method of controlling an aircraft having first and second hingeless rotors on first and second tilting masts, respectively, the first and second masts having first and second tilt actuators, respectively, comprising:
   providing a 4 bar linkage wherein said tilt actuators are rotary actuators that cooperate to assist in tilting the first mast, and wherein said 4 bar linkage comprises a first link, a second link, a tilting nacelle and an inner wing;
   changing rotor blade pitch on the first rotor to produce a first mast moment that controls a first tilt angle of the first mast;
   using the second tilt actuator to control a second tilt angle of the second mast; and
   controlling the first tilt angle independently of the second tilt angle to create a yawing moment to assist in rotating the aircraft.

2. The method of claim 1, further comprising configuring the first and second rotors in a tandem rotor rotorcraft configuration.

3. The method of claim 1, further comprising configuring the first and second rotors in a side by side rotor rotorcraft configuration.

4. The system of claim 1, further comprising coupling a wing to the first mast.

5. The system of claim 1, further comprising configuring the tilt actuator with an electric motor constructed to operate on more than three phases.

6. The method of claim 1 further comprising configuring the first mast with a brake, and utilizing the brake to lock the first tilt angle.

7. The method of claim 6 further comprising utilizing the brake in cooperation with the first mast moment to accommodate a failure of the first tilt actuator.

* * * * *